US012038263B2

(12) United States Patent
Chautar et al.

(10) Patent No.: US 12,038,263 B2
(45) Date of Patent: Jul. 16, 2024

(54) DEVICE FOR LAYING PASTE PATTERNS IN A TUBE

(71) Applicant: EURENCO, Sorgues (FR)

(72) Inventors: Bastien Chautar, Beleymas (FR); Julien Loyer, Saint Cernin de Labarde (FR); Sébastien Cuvelier, Cours de Pile (FR)

(73) Assignee: EURENCO, Sorgues (FR)

( * ) Notice: Subject to any disclaimer, the term of this patent is extended or adjusted under 35 U.S.C. 154(b) by 57 days.

(21) Appl. No.: 17/793,473

(22) PCT Filed: Jan. 14, 2021

(86) PCT No.: PCT/FR2021/050067
§ 371 (c)(1),
(2) Date: Jul. 18, 2022

(87) PCT Pub. No.: WO2021/144539
PCT Pub. Date: Jul. 22, 2021

(65) Prior Publication Data

US 2023/0064872 A1 Mar. 2, 2023

(30) Foreign Application Priority Data

Jan. 17, 2020 (FR) ........................................ 2000429

(51) Int. Cl.

| | |
|---|---|
| ***F42C 19/08*** | (2006.01) |
| ***B05D 1/00*** | (2006.01) |
| ***B05D 1/26*** | (2006.01) |
| ***B05D 7/22*** | (2006.01) |
| ***C06C 7/02*** | (2006.01) |

(Continued)

(52) U.S. Cl.
CPC .......... *F42C 19/0826* (2013.01); *B05D 1/002* (2013.01); *B05D 1/26* (2013.01); *B05D 7/22* (2013.01); *C06C 7/02* (2013.01); *F42B 3/195* (2013.01); *F42B 33/0207* (2013.01)

(58) Field of Classification Search
CPC .................................................... F42C 19/0826
See application file for complete search history.

(56) References Cited

U.S. PATENT DOCUMENTS

| | | | | |
|---|---|---|---|---|
| 3,182,595 | A | 5/1965 | Hassmann | |
| 3,453,163 | A | 7/1969 | Mills et al. | |
| 2005/0066568 | A1 * | 3/2005 | Kaufmann ........... | B23K 26/342 42/76.01 |

FOREIGN PATENT DOCUMENTS

| | | | | |
|---|---|---|---|---|
| DE | 3740986 | A1 * | 12/1987 | .......... F42C 19/0826 |
| EP | 0 754 927 | A1 | 1/1997 | |
| FR | 2593905 | A1 * | 2/1986 | .............. C06C 5/00 |

(Continued)

OTHER PUBLICATIONS

Jun. 15, 2021 International Search Report issued in International Patent Application No. PCT/FR2021/050067.

(Continued)

*Primary Examiner* — Bret Hayes
(74) *Attorney, Agent, or Firm* — Oliff PLC

(57) ABSTRACT

A device for depositing paste patterns on the surface of the channel of a tube, the device comprising a frame supporting a first mechanical assembly for holding, positioning and moving the tube, and a second mechanical assembly for extruding paste for depositing said paste patterns, the assemblies cooperating with one another.

8 Claims, 9 Drawing Sheets

(51) Int. Cl.

| | |
|---|---|
| ***F42B 3/195*** | (2006.01) |
| ***F42B 33/02*** | (2006.01) |

(56) References Cited

FOREIGN PATENT DOCUMENTS

| | | | | | |
|---|---|---|---|---|---|
| FR | 2 725 781 | A1 | | 4/1996 | |
| WO | WO-2019226575 | A1 | * | 11/2019 | ............ B22F 1/0011 |

OTHER PUBLICATIONS

Nov. 3, 2020 Search Report issued in French Patent Application No. 2000429.

* cited by examiner

DEVICE FOR LAYING PASTE PATTERNS IN A TUBE

FIELD OF THE INVENTION

The technical field of the invention is mainly that of tubes for cylindrical propellant charges having a central channel, equipping the munitions.

PRIOR ART

The propellant charges fitted to shells and missiles are ignited by means of a squib combined with an igniter tube. The igniter tube is formed of a combustible tube containing an ignition charge based on rapid combustion ignition powder. The igniter tube is placed in the channel of the propellant charge.

Patent application FR-A-2 593 905 describes an ignition charge placed in a combustible tube consisting of a pile of tablets of agglomerated ignition powder. These assemblies for an igniter tube require both the manufacture of agglomerated powder tablets, as well as their placing in the combustible tube.

However, the operation of filling the combustible tube with the ignition charge is a delicate operation, in terms of both the handling technique and the pyrotechnic risk (the ignition powder is classified in risk division 1.1 in the sense of the UN GHS classification ((UN) Globally Harmonised System for classification and labelling of chemical products). This operation requires special tooling in order to be automated. Moreover, when the ignition charge is introduced into the tube in admixture with a collodion in order to obtain tablets (in situ), the evaporation time for the solvent of the collodion is long because of the confinement of the collodion loaded in the tube.

Furthermore, it is sometimes necessary to dismantle the igniter tube of a propellant charge, for example when scrapping or neutralising ammunition. This dismantling of the igniter tube involves an extraction of the ignition charge arranged in the combustible tube. This extraction by direct contact with the agglomerated powder generates a pyrotechnic danger.

Patent application FR-A-2 725 781 proposes a method making it possible to better distribute the powder charge in the channel of the munition and facilitates the dismantling of the ignition material compared with agglomerated powder ignition material. In order to do this, the agglomerated powder tablets are replaced by an ignition material comprising an ignition composition in powdered form (typically gunpowder) deposited on a flexible support sheet, which is then advantageously rolled up on itself in order to be inserted in a combustible tube to form an igniter tube. In order that the powder (which is just placed on the flexible support) does not fall to the bottom of the igniter tube, the powdered composition must be covered with another flexible sheet (called a screen sheet), at least one of the screen and support sheets being coated with adhesive. However, the implementation of this method is complex because of the handling of the explosive ignition powder classified in risk division 1.1, the control of the regularity of the quantities of powder deposited in piles on the flexible sheet and the geometries of the piles, and the step of covering the piles of powder deposited on the flexible sheet by the sticky screen sheet. Moreover, the configuration possibilities for pyrotechnic objects are limited and controlled uniquely by the weight and the spatial distribution of the piles of powdered powder.

It would therefore be useful to have available a device enabling the deposition of paste patterns with varied geometries in a combustible tube. The present invention proposes to respond to this need.

SUMMARY OF THE INVENTION

The present invention relates to a device for depositing paste patterns on the inner or outer surface of the channel of a tube. The device comprises a frame C supporting a first mechanical assembly A for holding, positioning and moving the tube, and a second mechanical assembly B for extrusion, the assemblies A and B cooperating with one another. The invention also relates to a method using the above-mentioned device.

DESCRIPTION OF THE INVENTION

Figure 1:
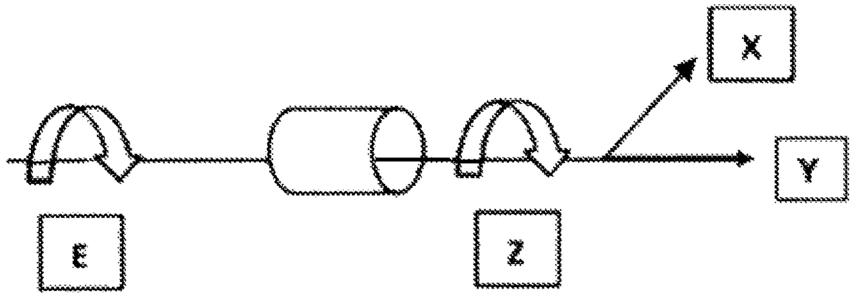
FIG. 1 schematically represents the reference frame for movement of the device of the invention in a combustible tube.

The present invention relates, according to a first aspect, to a device for depositing paste patterns, in particular of ignition charge, on the inner or outer surface, preferably the inner surface, of a channel of a tube, in particular a combustible tube. The description which follows takes, as its reference frame, the axis Y horizontally positioned along the central axis of the tube, the axis X along a horizontal direction orthogonal to the axis Y, the rotation Z around the axis Y (tube rotation), and the rotation E around the axis Y (rotation of the syringe pushing screw), as shown in FIG. 1.

The device comprises a frame C supporting two mechanical assemblies A and B which cooperate:

a first assembly A, for holding, positioning and moving the tube;

a second assembly B for extrusion.

Figure 2:
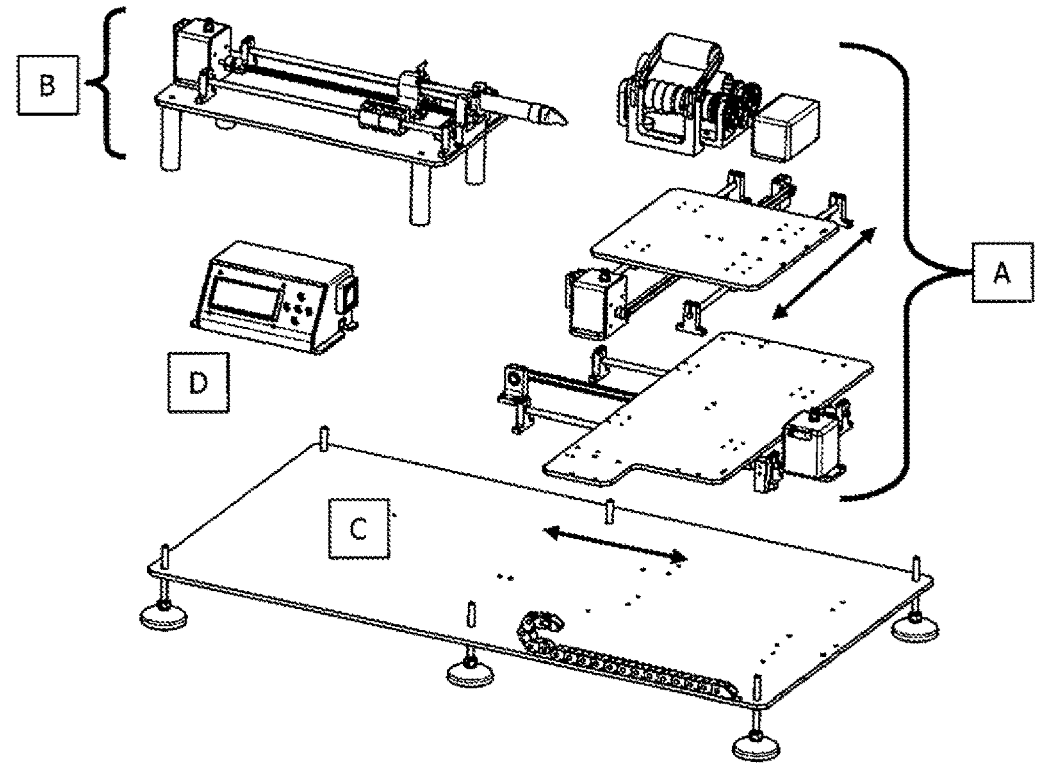
FIG. 2 schematically represents the assemblies A and B, the frame C, and a control module D.

As illustrated in FIG. 2, the first assembly A comprises two superimposed tables allowing movement along the X and Y axes, and incorporates on the upper table a system for holding and rotating the tube along an axis of rotation Z. The second assembly B comprises a plate supporting a linear pushing system and a cylindrical cartridge. The cartridge contains the ignition charge paste to be deposited. The cartridge is prolonged at one of its ends by a bent tubular extension provided with an extrusion nozzle and, at its other end, contains a piston sliding with controlled movement.

Figure 3:
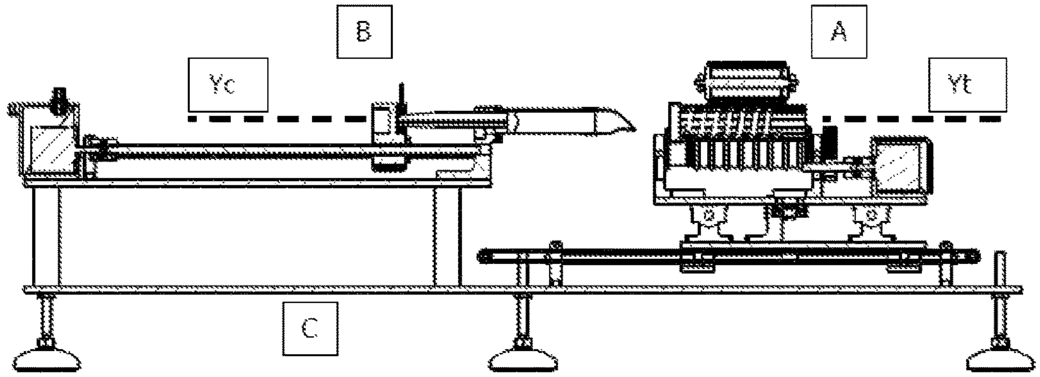
FIG. 3 shows the installation of assemblies A and B on the frame C.

These two assemblies A and B are mounted on a same frame C so that the longitudinal axis Yc of the cartridge and the axis of revolution Yt of the tube are coplanar in the plane (X, Y), as shown in FIG. 3.

Figure 4:
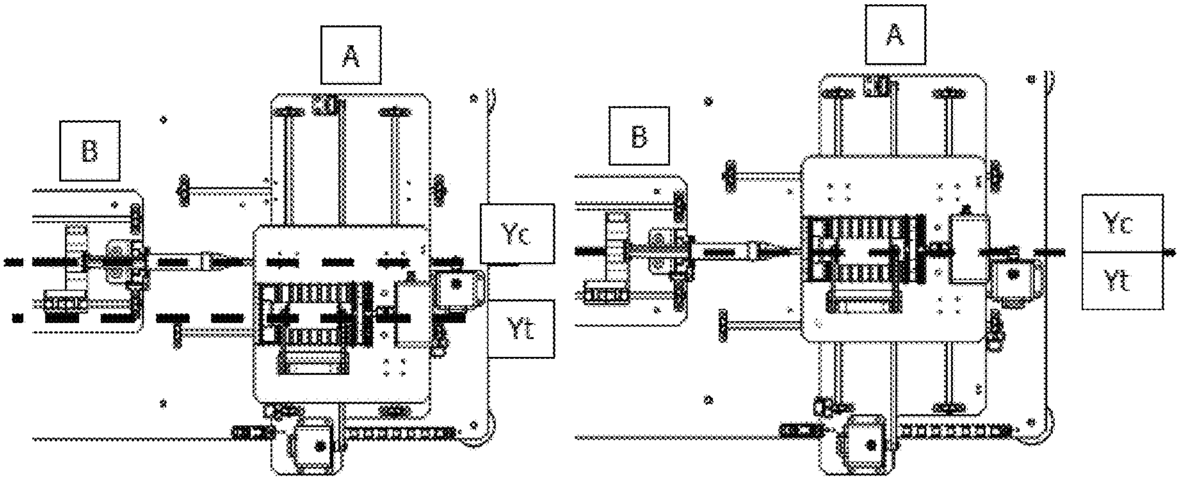
FIG. 4 shows movement of the combustible tube along the axis X.

The assembly A has a mobile shaft driven by a stepper motor enabling the tube to be moved along the axis X and aligning the axis Yt of the tube with the longitudinal axis Yc of the cartridge, as shown in FIG. 4.

For the deposition phase, assembly A ensures the moving of the tube, on the one hand for rotation Z about its central axis Y and, on the other hand, for translation along the axis Y. The two rotation and translation movements are driven separately by controlled actuators. These actuators are, for example, stepper motors, controlled by software interfaces of the type known for 3D printers. The rotation and translation movements of the tube can be continuous or discontinuous in stages, at constant or variable speed.

Figure 5:
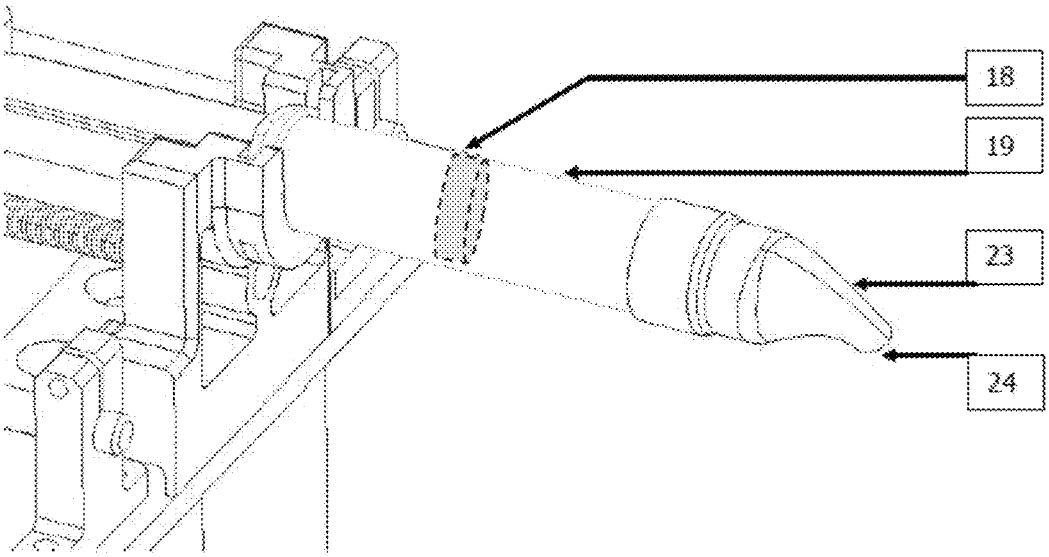
FIG. 5 shows a cartridge used in the device of the invention.

The assembly B supports a cylindrical cartridge containing the ignition charge paste mounted on a fixed table, as shown in FIG. 5. The cartridge is oriented along the axis Y and is provided at one end, towards the tube, with a curved tubular extension terminating in an extrusion nozzle. Therefore, the cartridge and the nozzle cannot move along the axis Y but the horizontal movement travel along the axis Y ensured by assembly A is sufficient so that the nozzle penetrates into the channel of the tube over its entire length. A piston, actuated in the body of the cartridge by a jack or a worm screw, is capable of moving in translation in the body of the cartridge and along the longitudinal axis Yc. The movement in translation of the jack or of the screw is generated by a stepping motor controlled by a software interface, for example of the type used for 3D printers. For the depositing phase, the flow rate of paste via the nozzle is regulated by the movement of the piston. The paste extruded by the nozzle is deposited on the surface of the channel of the tube in order to form the desired pattern or patterns.

Figure 6:
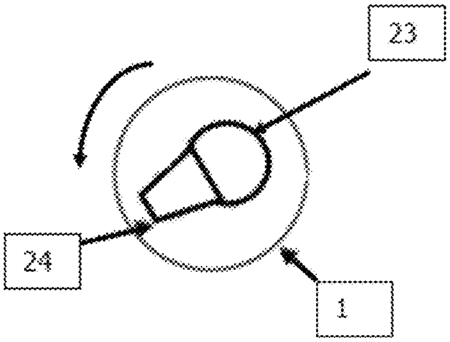
FIG. 6 shows the direction of rotation of the combustible tube and the orientation of the nozzle in order to obtain a circular or helical deposit.

The angular orientation of the nozzle in the plane (Y, Z) is decisive for the quality of the deposit in the tube. This angular orientation is a function, in particular, of the viscosity of the paste, the speed of rotation of the tube and the adhesion of the paste on the tube. Advantageously, the nozzle is orientated at about 225° for a rotation of the tube in the anticlockwise direction in order to obtain a circular or helical deposit (the tube then also moving in translation), as shown in FIG. 6.

The coordination of the movements of the tube (in rotation about the axis Y and in translation along the axis Y) and of the piston of the cartridge along the axis Y, makes it possible to control, at each instant, the position of the deposition in the channel of the tube and the quantity of paste deposited. This coordination is ensured, for example, by a computer program for controlling motors taking into account as input data, in particular, the size characteristics of the deposit (weight deposited, patterns, etc.) of the ignition charge and those of the tube (diameter, length, etc.).

In one embodiment, the cartridge is temperature conditioned so as to maintain the viscosity of the paste at a value ensuring its extrusion and flowability.

This device makes it possible to deposit paste patterns of varied geometries in the tube, for example linear patterns along the axis of the tube, circular, helical and triangular (chevrons) patterns. A plurality of patterns can be deposited successively in the channel of the tube, for example a plurality of helical patterns that are angularly offset or intertwining of patterns. The quantity of paste deposited within a given pattern can also vary according to the position in the channel by varying the speed of advancement of the piston of the syringe and/or the speed of rotation/translation of the tube. It is also possible to obtain patterns of pastes in different compositions, either by introducing into the cartridge at least two stages of different compositions, or by repeating the depositing operation with cartridges containing different compositions.

The tube is made, for example, of plastic, metal or fibrous material. Advantageously, the tube is made of combustible fibrous material of the type used for tubes for propellant charges. By way of indication, the combustible tube, such as those marketed by the company Eurenco, consists of 60 wt % to 80 wt % cellulose ester, 17 wt % to 37 wt % cellulose, 3 wt % to 7 wt % resin and 0 wt % to 2 wt % stabilising additive (the sum of these various constituents being equal to 100%). Its weight is about 15 g to 25 g. The combustible tube has a height of from about 120 mm to 140 mm, for an inner diameter of from 25 mm to 30 mm and a thickness of from 1.5 to 2.5 mm.

Advantageously, the combustible tube has the composition given in table 1 and the dimensions given below.

TABLE 1

| Composition | wt % |
|---|---|
| Nitrocellulose powder cotton | 69 |
| Cellulose | 25 |
| Resin | 5 |
| Stabilising additive | 1 |

The weight of such a combustible tube is 18 g+/−3 g, its height is 126 mm, for an internal diameter of 28 mm and a thickness of 1.8 mm.

In one embodiment, the surface of the tube can be prepared, prior to the depositing of the paste, by sanding or by depositing a primer in order to promote the adhesion of the paste during the depositing.

In one embodiment, the tube installed on the device of the invention can have a length that is a multiple of that of the unit tube forming the channel of the munition, it is then, after depositing, cut into sections of equal length to that of the unit tube.

The cartridge containing the paste is, for example:

a simple syringe equipped with its piston, the tip of which has been cut in order to receive the tubular extension, or a plastic cartridge equipped with a piston of the type used for extruding masonry pastes or silicone joints, or a cylindrical body equipped with a piston receiving a cylindrical flexible pouch of the type of those marketed by the company Titanobel or by the company Würth France.

In one embodiment, the cartridge is automatically filled with paste from a paste tank. A tubular connection between the tank and the cartridge makes it possible to fill the cartridge when the piston is moved back, leaving the volume of the cartridge free. This avoids replacement of the cartridge after use of its paste contents, in order to carry out a new depositing.

The deposited paste can keep its pasty aspect or solidify (for example by evaporation of a solvent or solvents, or cross-linking of a polymer). The patterns obtained after depositing are thus either pasty or solid depending on the desired end product. It is possible that some of the patterns keep their pasty aspect while some others are solidified according to the compositions of deposited pastes (by incorporation at least two different compositions in the cartridge, or by carrying out successively at least two deposits with different compositions).

In one embodiment suitable for depositing an ignition charge in the combustible tube, the paste consists of a collodion loaded with an ignition powder, which solidifies by evaporation of the one or more solvents after deposition to produce solid patterns.

The collodion is of the type nitrocellulose base+solvent (s). In one embodiment, the nitrocellulose base of the collodion consists of a cellulose ester (for about 70 wt % to about 90 wt %) and generally contains, in addition, conventionally, at least one plasticiser (about 1 wt % to about 20 wt %, preferably about 10 wt %) and at least one stabiliser of the cellulose ester (about 0.5 wt % to about 5 wt %). It also generally contains at least one additive (>0 wt % to about 1 wt %), for example selected from anti-adhesion agents, anti-flash agents and antioxidants. It can contain a residual quantity of solvent(s), in particular anti-phlegmatising solvent(s) or (and) solvent(s) for dissolving the cellulose ester used during its manufacture.

Advantageously, the cellulose ester used as a majority component is selected from cellulose nitrate, cellulose acetate and nitrocellulose, the latter being preferred. The weight content of nitrogen of the nitrocellulose is ideally 10.5% to 13.5%, an example being grade E nitrocellulose with a weight content of nitrogen of 11.8% to 12.3%, advantageously equal to 12%.

The plasticiser used to prepare the collodion can be, in particular, a ketone (such as camphor), a vinyl ether (such as LUTONAL® A50 marketed by the company BASF), a polyurethane (such as NEP-PLAST 2001 marketed by the company Hagedorn-NC), an adipate (such as dioctyl adipate) or a citrate (such as triethyl 2-acetylcitrate).

The stabiliser used to prepare the collodion can be, in particular, a compound the chemical formula of which comprises aromatic rings (ideally two aromatic rings), capable of fixing the nitrogen oxides from the decomposition of nitric esters (presently nitrocellulose). Examples of stabiliser may include 2-nitrodiphenylamine (2NDPA), 1,3-diethyl-1,3-diphenyl urea (centralite I), 1,3-dimethyl-1,3-diphenyl urea (centralite II), and 1-methyl-3-ethyl-1,3-diphenyl urea (centralite III).

The optional additive used for preparing the collodion can be selected, in particular, from anti-adhesion agents, such as silicone-type anti-adhesion agents, anti-flash agents, antioxidants, dyes, surfactants, anti-agglomeration agents and hydrophobic agents.

The solvent can be a double solvent of the acetone/butyl acetate type (BA) at 50 wt %/50 wt %.

The collodion is advantageously formulated to lead to a dry extract (after evaporation of the solvent) of 10 wt % to 40 wt %.

By way of indication, table 2 below presents a formulation of the collodion with 14 wt % dry extract.

TABLE 2

| | | Collodion | |
|---|---|---|---|
| | | Composition (wt %) | |
| Nitrocellulose base | Nitrocellulose | 84 | 14 |
| | Plasticiser | 10 | |
| | Stabiliser | 3.5 | |
| | Others (additive(s), water, solvent . . . ) | 2.5 | |
| | Total | 100 | |
| | BA | | 43 |
| | Acetone | | 43 |
| | Total | | 100 |

In one embodiment, the collodion loaded with ignition powder(s) comprises about 50 wt % to about 70 wt % powder(s), and the rest to 100% (in other words about 30 wt % to about 50 wt %) collodion. Conventionally, the one or more previously constituted ignition powders, are added to the collodion.

Conventionally, the one or more previously constituted ignition powders, are added to the collodion. The powder used is preferably gunpowder (GP) having a composition by weight:

potassium nitrate (saltpetre): ~75%
charcoal: ~15%
sulfur: ~10%.

The collodion loaded with ignition powder is advantageously obtained by addition of the previously constituted ignition powder, in the solvent. It is then given the name “Benite B”. It differs from those of the prior art, designated “benite”, obtained by separate additions to the collodion of constituents of the ignition powder and without plasticiser. By way of indication, table 3 below gives an example of the composition of the collodion of table 2, loaded with ignition powder GP7 (which is a fine particle size powder).

TABLE 3

| Raw materials | Weight (g) | Composition (wt %) |
|---|---|---|
| GP7 | 10.36 | 56 |
| Collodion | 8.14 | 44 |
| Total | 18.5 | 100 |

The collodion loaded with ignition powder is classified in risk division 1.4 within the meaning of the UN GHS. The danger zones to take into account for handling the loaded collodion are therefore reduced, which facilitates the operations of depositing the collodion on the tube.

After drying (evaporation of the solvent) of the loaded collodion, the dry product (i.e. the ignition charge) comprises about 88 wt % to about 92 wt % ignition powder(s), about 7 wt % to about 10 wt % cellulose ester, the rest to 100% being provided by at least one compound selected from a plasticiser, an additive and a residual solvent. By way of indication, the dry product obtained after drying (evaporation of the solvent) of the collodion of table 3 contains the weight ratios indicated in table 4 below.

TABLE 4

| Dry Benite B composition | Weight (g) | wt % |
|---|---|---|
| PN7 | 10.36 | 90.08 |
| Nitrocellulose | 0.96 | 8.35 |
| Plasticiser | 0.11 | 0.96 |
| Stabiliser | 0.04 | 0.35 |
| Residues (water, solvent, etc.) | 0.03 | 0.26 |
| Total | 11.50 | 100.00 |

The viscosity of the paste is adjusted so as to allow its loading by pouring into the cartridge, its extrusion via the nozzle, and its non-flowing depositing on the tube.

Any geometry and depositing of patterns on the inner surface (channel) of the tube by means of the device of the invention can be envisaged.

In the case of an ignition charge, the shapes more particularly selected are spaced point patterns, or spaced circular patterns along the length of the channel, or linear patterns along the length of the channel, or one or more helical patterns along the length of the channel. The deposits are not necessarily all identical in size and/or composition and are not necessarily all arranged in a regular manner.

Figure 7:
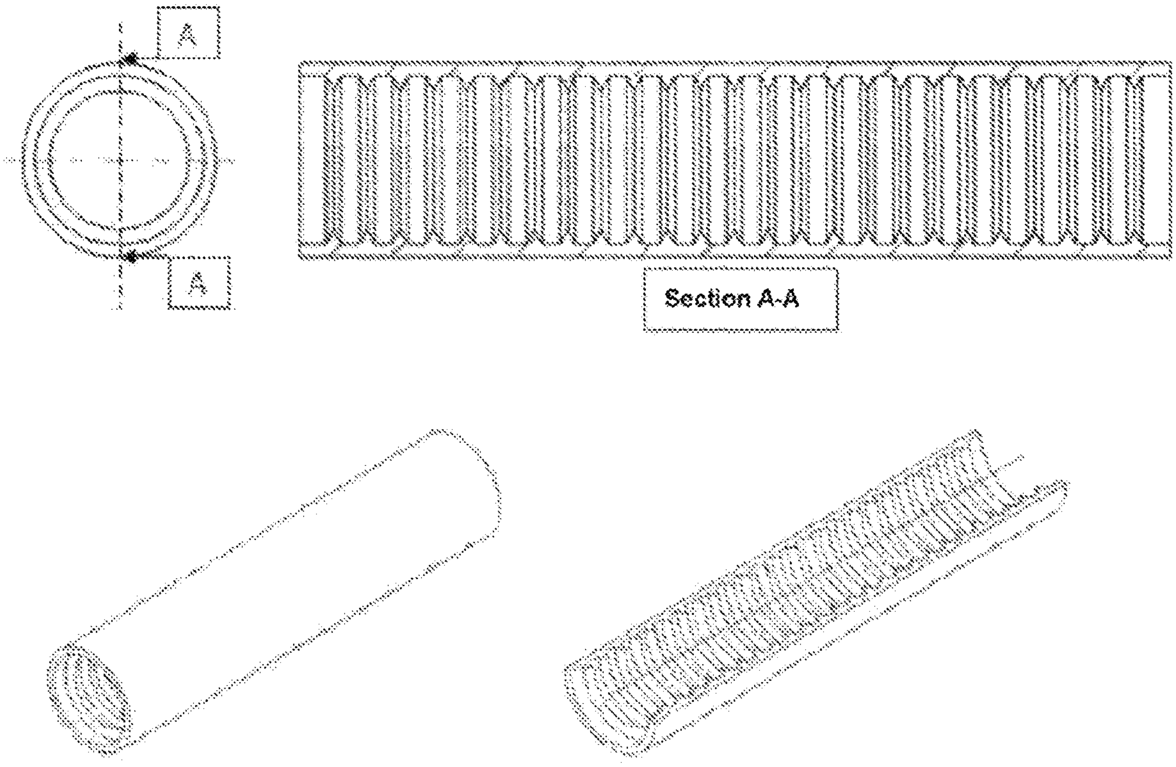
FIG. 7 illustrates a circular deposit of paste in a combustible tube.
Figure 8:
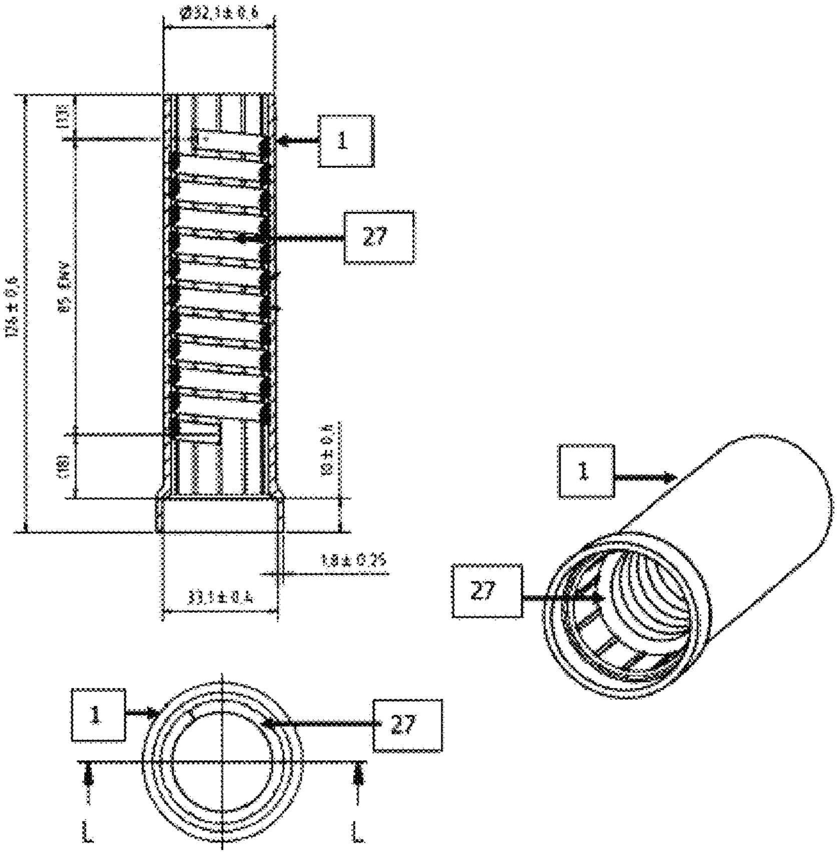
FIG. 8 illustrates a helical deposit of paste in a combustible tube.

The number of deposits, their geometry and their arrangements constituting the ignition charge in the channel of the tube are adjustment parameters of the ignition charge. FIGS. 7 and 8 show shapes of ignition charge deposited in the channel of a tube.

As previously indicated, the device according to the invention therefore comprises two assemblies A and B, mounted on a same frame C, which cooperate, assembly A which is suitable for holding and controlling the movements of the tube, and assembly B which is fixed and supports a cylindrical cartridge containing the paste to be deposited. The motors (see below) of assemblies A and B are controlled by a control module D.

Figure 9:
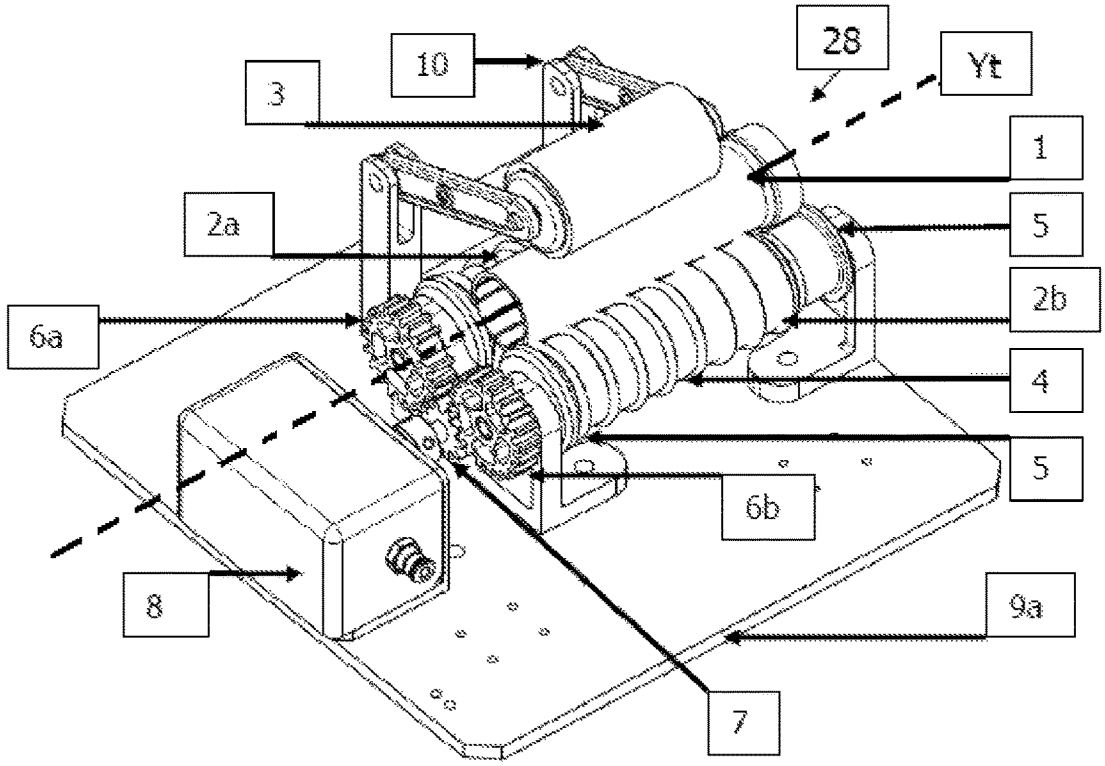
FIG. 9 represents assembly A of the device of the invention.

Assembly A comprises the elements described below, represented in FIG. 9.

A system 28 enables the positioning and rotating of the tube 1. This system 28 comprises rollers 2*a*, 2*b* and 3, disposed in a triangle and between which the tube 1 is positioned. Rubber rings 4 are disposed on the rollers 2*a* and 2*b* in order to ensure a rotational driving contact with the tube 1. The rollers 2*a* and 2*b* comprise, at their ends, a circular shoulder 5 allowing the tube 1 to be held in position along the axis Y. They also each comprise, at their end opposite to assembly B, a toothed wheel 6*a*, 6*b*. The system 28 comprises a toothed wheel 7 coupled with a shaft rotated via a stepping motor 8 controlled by a software of the same type as those equipping 3D printers. The toothed wheel 7 cooperates with the toothed wheels 6*a*, 6*b* in order to rotate the tube 1.

The three rollers 2*a*, 2*b* and 3 are assembled and thus fixed using brackets on the table 9*a*. The roller 3 in the upper position is provided with means allowing it to be disengaged in order to position the tube 1 on the rollers 2*a* and 2*b*, then to fold it into contact above the tube 1. In one embodiment, the roller 3 is held by an articulated arm 10 connected to the table 9*a*.

Figure 10:
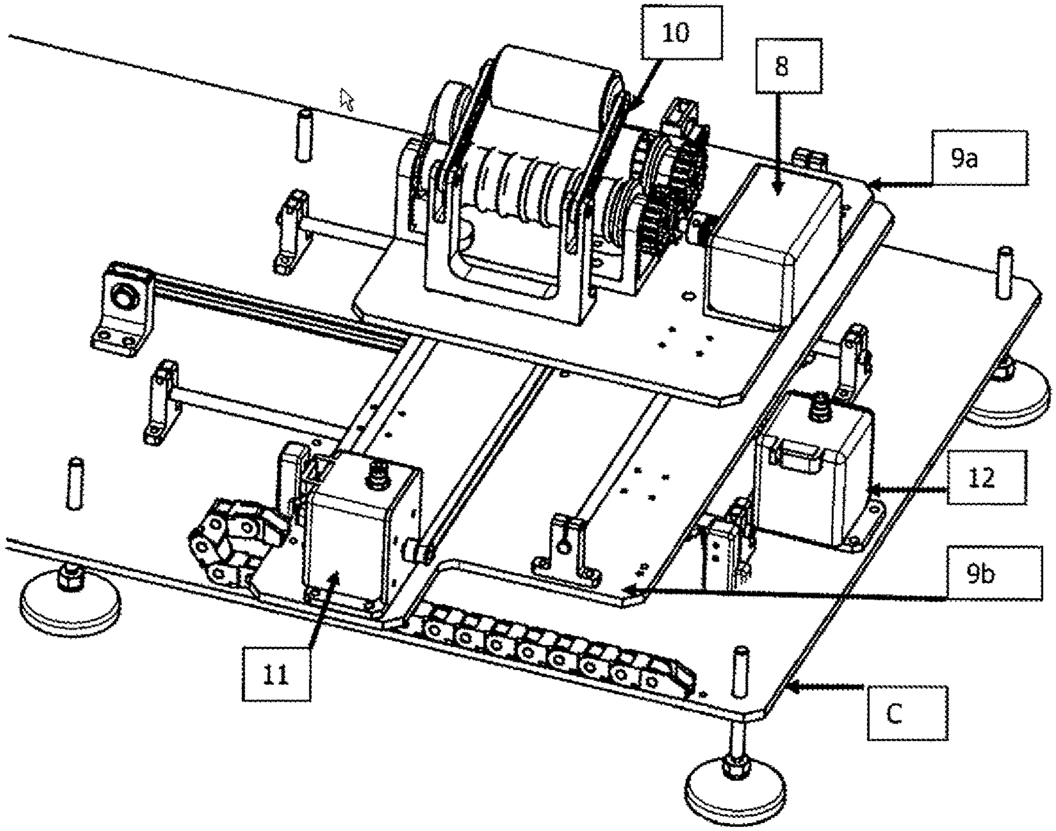
FIG. 10 shows the elements of assembly A ensuring the movements in X and Y.

As shown in FIG. 10, table 9*a* is mounted on a second table 9*b*, the connections between these two tables and the frame C are produced by means of rings, for example linear ball bearings (sliding on rails), for guidance, and toothed pulleys and belts for movement, this allowing a movement of the table 9*a* along the axis X relative to the table 9*b* (movement generated by the motor 11) and a movement of the table 9*b* along the axis Y relative to the frame C (movement generated by the motor 12). The assembly is controlled by a software of the same type as those equipping 3D printers. This degree of freedom makes it possible to laterally disengage the table 9*a* along the axis X in order to facilitate the positioning and removal of the tube 1 within the three rollers 2*a*, 2*b* and 3. It also allows a precise positioning of table 9*a* in order to make axis Yt of the tube 1 coincide with axis Yc of the cartridge 19 (see below).

Figure 11:
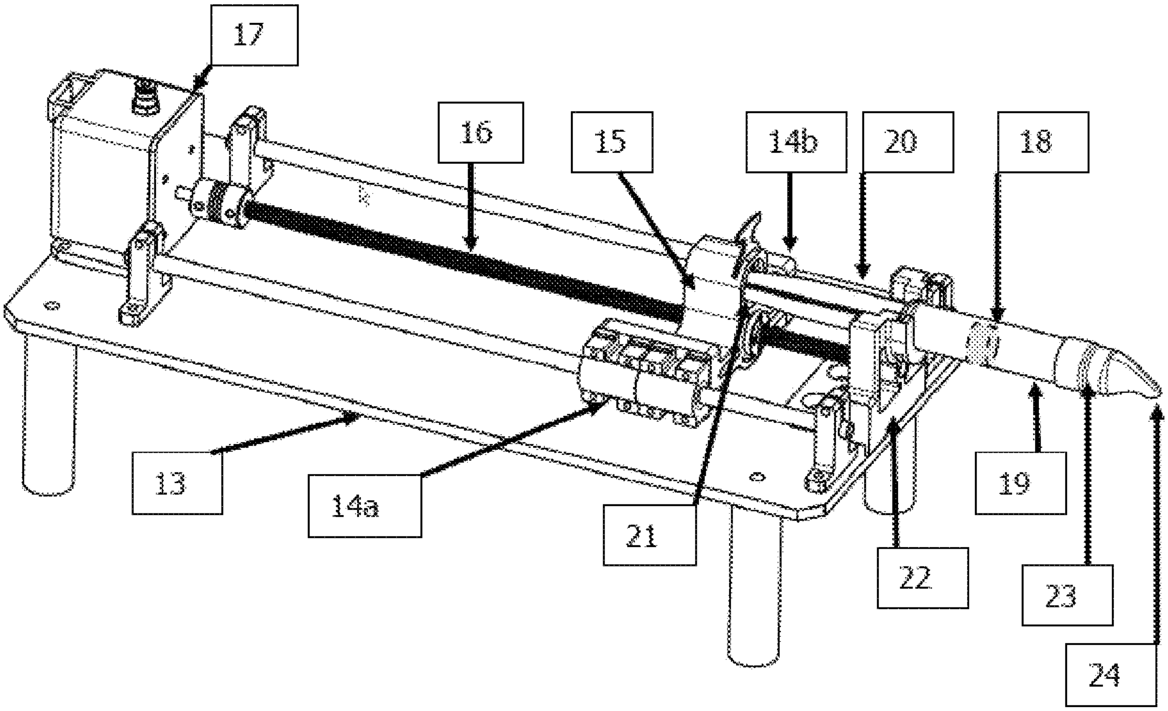
FIG. 11 represents an alternative of assembly B of the device of the invention.

The assembly B, disposed facing assembly A, comprises the elements described below, represented in FIG. 11.

A fixed table 13 supports two rings 14*a* and 14*b*, such as ball sockets, sliding on guide rails, co-linear with the axis Y, enabling the sliding of a carriage 15. This carriage 15 is moved by a worm screw 16 actuated by a stepping motor 17. The carriage 15 makes it possible to move the piston 18 of the cartridge 19 containing the paste by means of a connecting rod 20.

The table 13 is disposed on the frame C. When the cartridge is a syringe, the rod 20 and the piston 18 (also called a stopper in the terminology of syringes) form a single piece. The plunger of the piston 18 of the syringe is housed in a central chamber 21, equipped with a clasp, of the carriage 15. The clasp ensures the connection in the central chamber 21 between the plunger of the piston 18 and the carriage 15. A cradle 22 that is fixed on the table 13 holds the body of the syringe. The central chamber 21 of the carriage 15 and the cradle 22 are aligned and disposed so that the axis Yc of the syringe is co-linear with the Y-axis. A tubular extension 23 terminated by a nozzle 24 is disposed at the end of the syringe in place of the original tip of the syringe.

Figure 12:
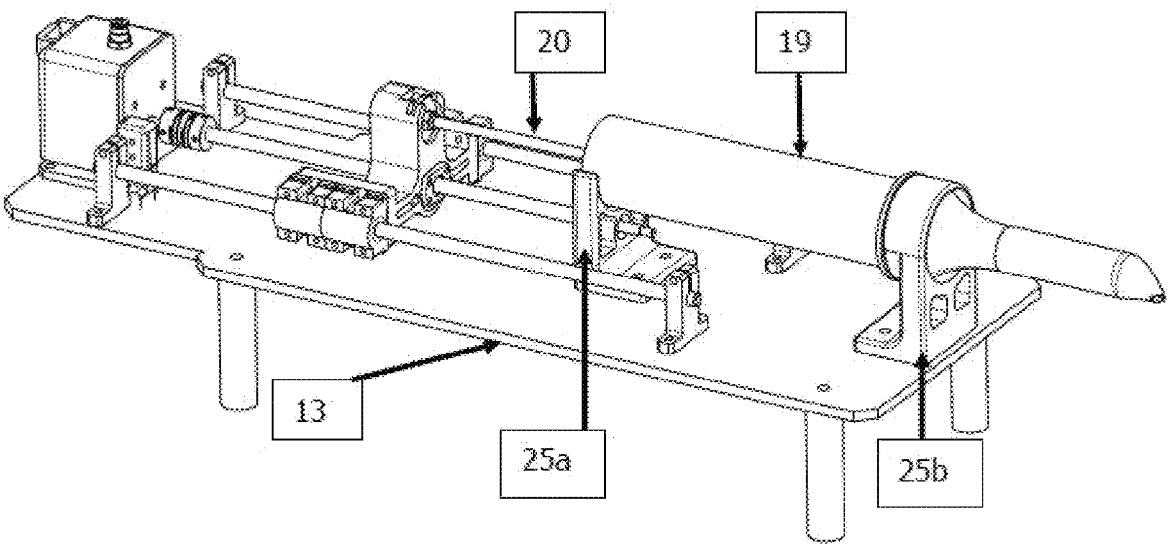
FIG. 12 represents an alternative of assembly B of the device of the invention.

As shown in FIG. 12, when the cartridge 19 is a cylindrical body equipped with a piston, the rod 20 is centrally fixed to the piston 18. At its other end, the rod 20 is held by a clasp in a central chamber 21 of the carriage 15. The cartridge 19 is equipped at one of its ends with a curved tubular extension 23, terminated by a nozzle 24. Two legs 25*a* and 25*b* are fixed facing each other on the table 13. Leg 25*a* comprises a bore with a counter bore and the other 25*b* comprises a half-bore with a shoulder so as to house the two ends of the cartridge (in the manner of a gun for a masonry cartridge). The legs 25*a* and 25*b* fixed on the table 13 and the central chamber 21 of the carriage 15 are aligned and disposed in such a way that the axis Yc of the cartridge is co-linear with the Y-axis.

According to another aspect, the invention relates to a method for depositing paste patterns on the (inner or outer, preferably inner) surface of the channel of a tube. In what follows, a method of implementation of the device of the invention is described, for depositing a helical pattern of ignition charge on the inner surface of a combustible tube, by using, as the cartridge containing the ignition charge paste, a cartridge with a cylindrical body and equipped with a piston.

Figure 13A:
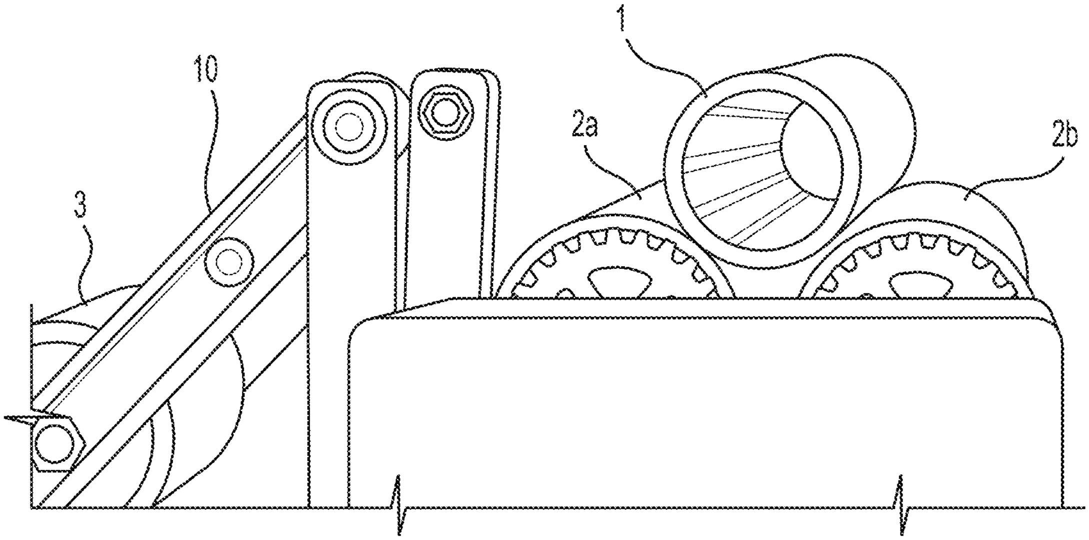
FIG. 13*a* represents a state of the device of the invention during its use.
Figure 13B:
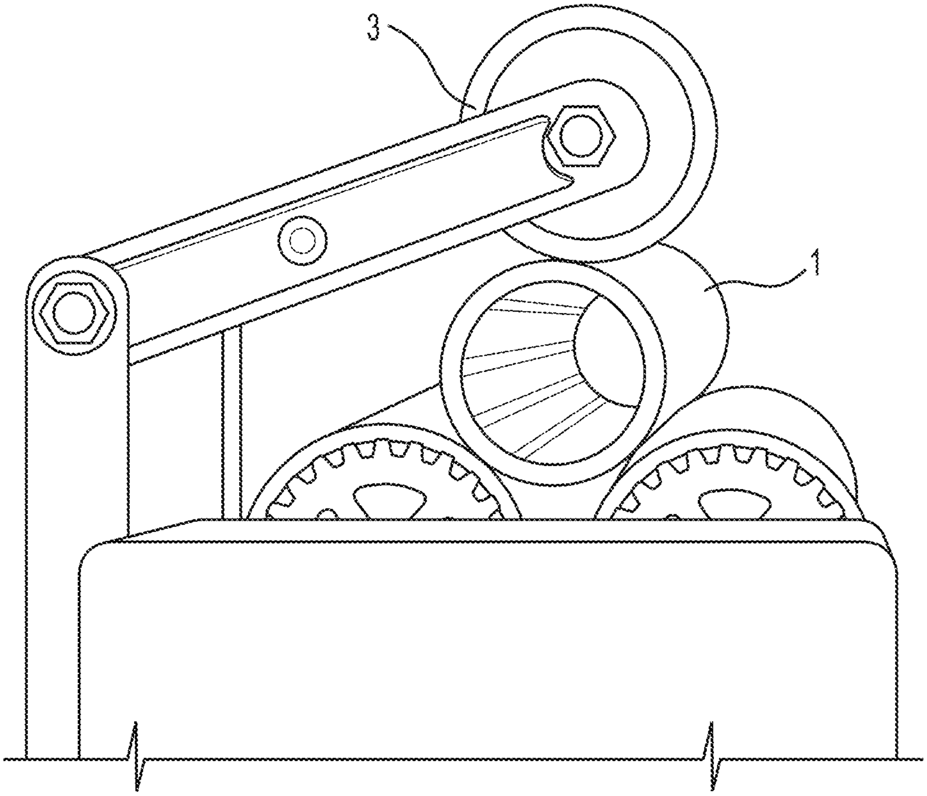
FIG. 13*b* represents a state of the device of the invention during its use.

At the start of the implementation, the articulated arm 10 supporting the roller 3 is unfolded and the position of the table 9*a* is offset with respect to the axis Yc of the cartridge so as to facilitate the installation of the tube 1. The tube 1 is placed on the rollers 2*a* and 2*b* as shown in FIG. 13*a*. Then, the roller 3 is brought into contact with the upper part of the tube 1 as shown in FIG. 13*b*.

Figure 14:
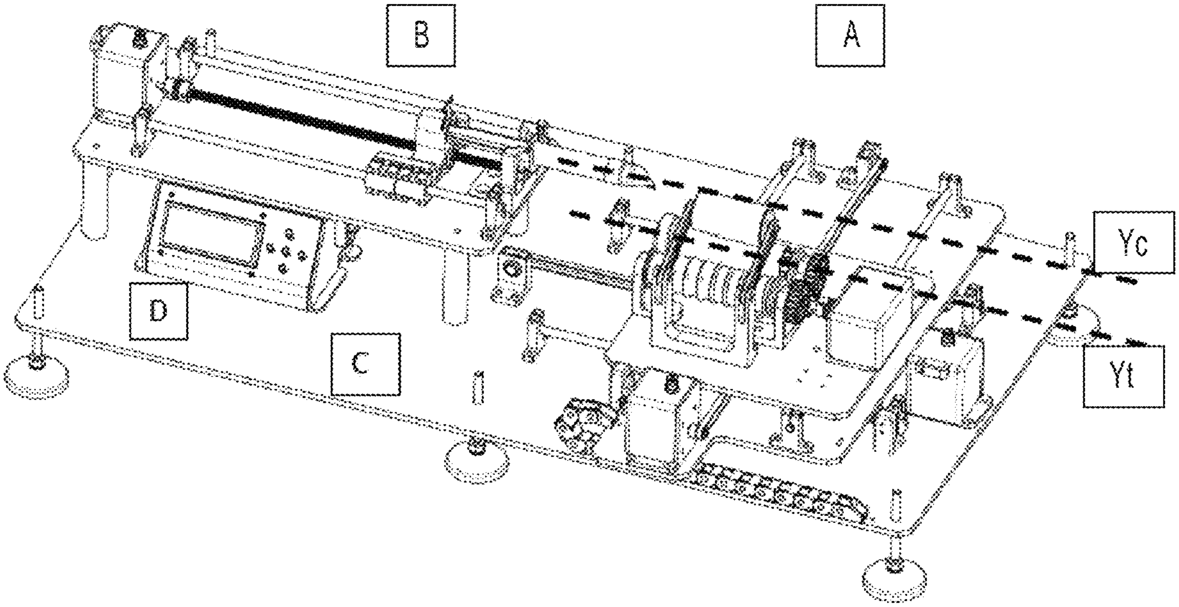
FIG. 14 represents a state of the device of the invention during its use.

The carriage 15 is then moved back towards the motor 17 so as to leave free space for positioning the cartridge 19. The cartridge 19 containing the paste and equipped with its piston 18 connected to the rod 20 is positioned on the legs 25*a* and 25*b*. Then, the carriage 15 is advanced in order to secure the end of the rod 20 in the chamber 21 equipped with a clasp. The status of the device at this stage of implementation is shown in FIG. 14.

Figure 15:
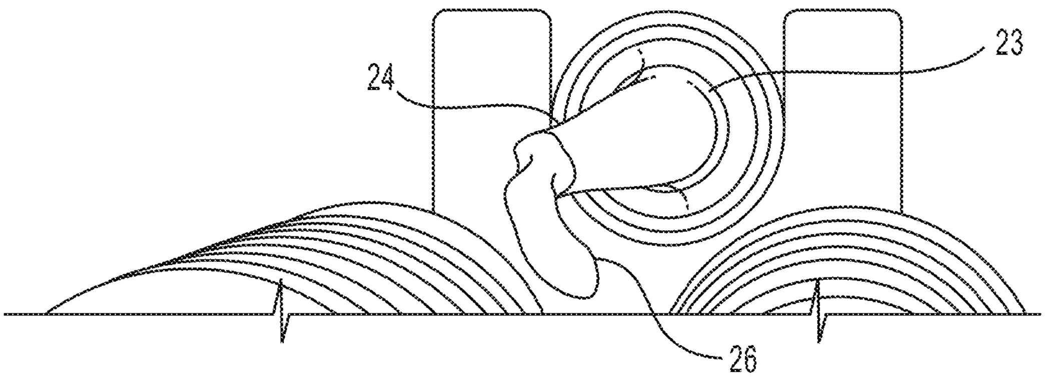
FIG. 15 represents a state of the device of the invention during its use.

The priming of the cartridge 19 allows the filling with paste of the tubular extension 23 and the nozzle 24 by moving the piston 18 until the paste 26 starts to be extruded by the nozzle 24, as shown in FIG. 15.

Figure 16:
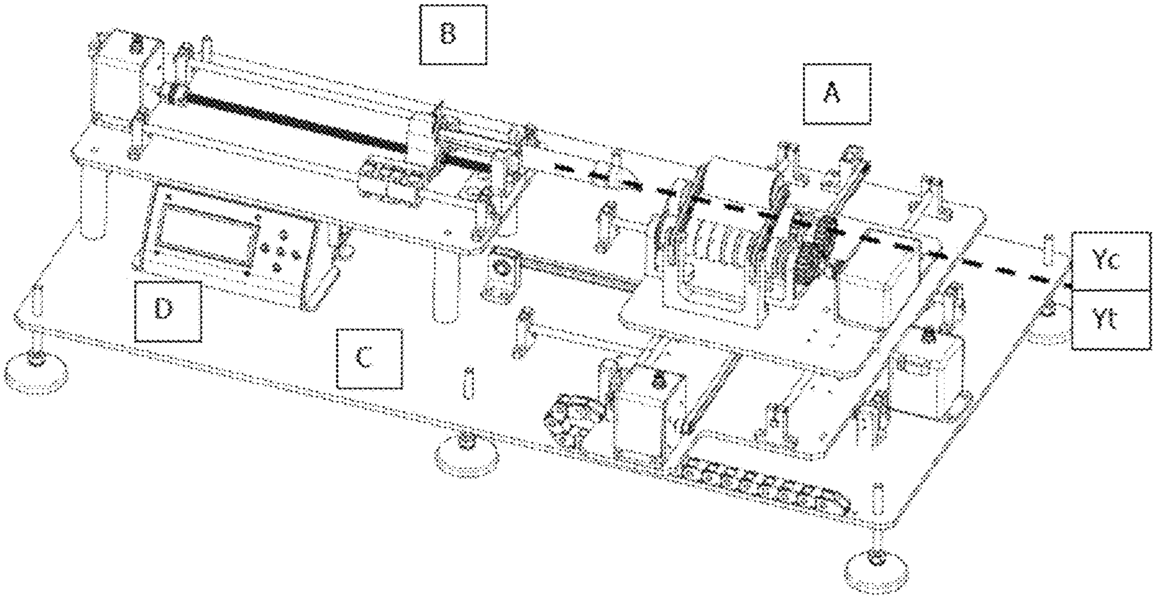
FIG. 16 represents a state of the device of the invention during its use.

The table 9*a* is then moved along the axis X by actuating the motor 11 so as to align the axes Yt of the tube 1 and Yc of the cartridge 19. The device is then in the state shown in FIG. 16.

Figure 17:
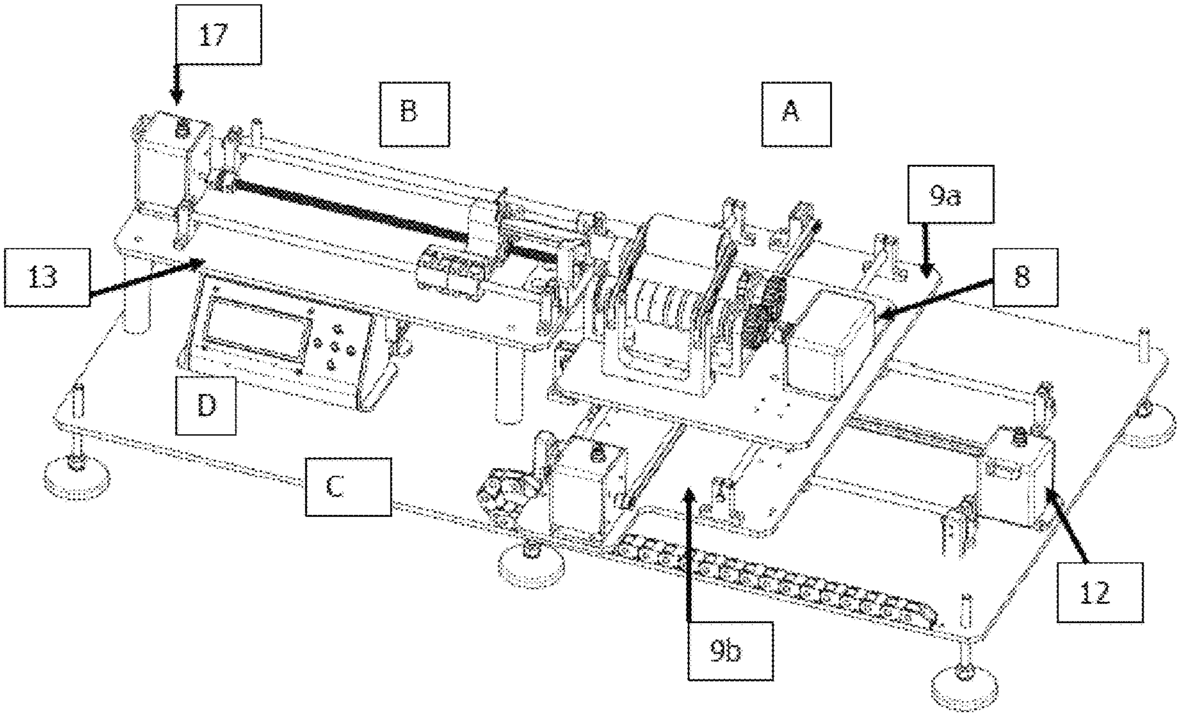
FIG. 17 represents a state of the device of the invention during its use.

The table 9*b* is then moved along the Y-axis by means of the motor 12 so as to make the nozzle 24 for extruding the paste penetrate to the initial point of deposition in the channel of the tube 1, as shown in FIG. 17.

Figure 18:
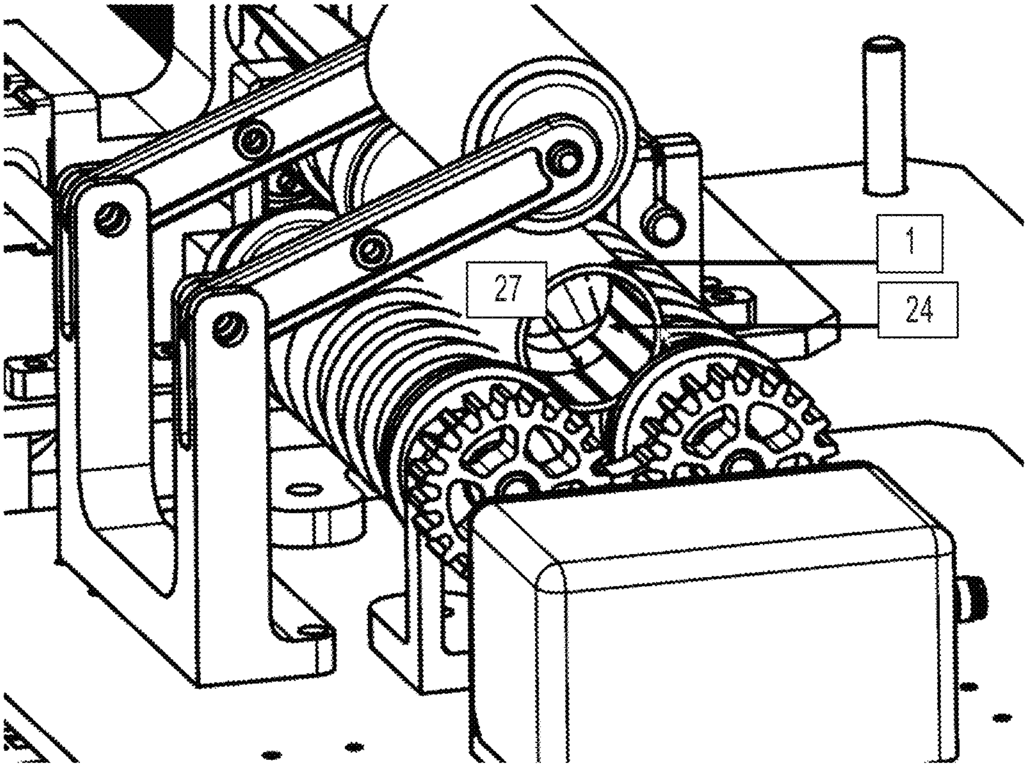
FIG. 18 illustrates a helical deposit of paste in a combustible tube.
Figure 19:
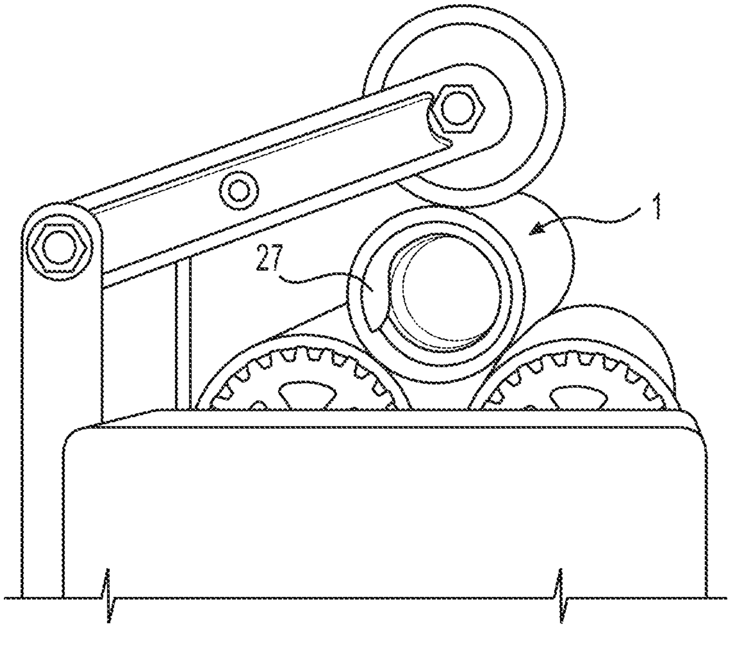
FIG. 19 illustrates a helical deposit of paste in a combustible tube.

The tube 1 is then rotated by means of the motor 8, and the deposition phase is then engaged by simultaneously actuating the motor 12 causing the movement of the tube 1 along the axis Y and of the motor 17 causing the advancement of the piston 18 of the cartridge 19. The conjunction of the actions generated by each of the three motors 8, 12 and 17 leads to a helical depositing of paste 27 on the inner surface of the tube, as shown in FIGS. 8, 18 and 19. After the deposit of the pattern, the tables 9*a* and 9*b* are returned to their initial position and the tube is withdrawn from the device.

By way of indication, the settings listed in table 5 can be used for the implementation of the device as described above.

TABLE 5

| | |
|---|---|
| Dimensions of the tube | Øint 28.5 mm/Lg Ht: 126 mm |
| Paste density | 1.2 g/cm$^3$ |
| Cartridge dimensions | Øint: 20.2 mm/useful Lg: 78 mm |
| Nozzle diameter | Ø 6 mm |
| Nozzle inclination | 235° (or 8 o'clock) |
| Speed [Mrot_tube] | 2 rpm |
| Speed [My_tube] | 14 mm/min |
| Speed [My_piston] | 7 mm/min |
| Linear density of deposited paste | 16.5 g/mL |
| Length of the pattern | 1000 mm |

The device of the invention is useful for depositing paste patterns inside a tube and, more particularly, for obtaining ignition tubes for propellant charges. It can also be used for any application requiring the deposit of patterns in a tube, for example in the industrial, pharmaceutical or food fields.

The invention claimed is:

1. A device for depositing paste patterns on a surface of a channel of a tube, the device comprising a frame supporting a first mechanical assembly A for holding, positioning and moving the tube, and a second mechanical assembly B for extruding paste for depositing the paste patterns, the assemblies A and B cooperating with one another, and assembly A:

comprises a first table mounted on a second table, these two tables enabling a movement along a horizontal axis Y positioned along a central axis of the tube and along an axis X positioned along and orthogonal to the axis Y, and comprises a system on the first table, wherein the system is configured to hold and rotate the tube around the axis Y.

2. The device according to claim 1, wherein the first table comprises:

the tube positioned between three rollers fixed on the table, two of the rollers each comprising, at one end, a circular shoulder allowing the tube to be held in position along the axis Y, and at the other end a toothed wheel;

a motor for rotating a further toothed wheel which cooperates with the toothed wheels positioned at the end of each of said two rollers in order to rotate the tube.

3. The device according to claim 2, further comprising means for disengaging the third roller from the tube.

4. The device according to claim 1, wherein the second table is fixed on the frame, the first table being mounted on the second table so as to allow a movement of the first table along the axis X relative to the second table, and a movement of the second table along the axis Y relative to the frame.

5. The device according to claim 1, wherein assembly B comprises:

a fixed table supporting two rings sliding on guide rails, co-linear with the axis Y;

a carriage moved by a worm screw actuated by a motor;

a cartridge comprising a piston provided with a connecting rod, a tubular extension and a nozzle.

6. The device according to claim 5, wherein the cartridge is a syringe, and wherein:

the rod and the piston form a single piece;

the plunger of the piston of the syringe is housed in a central chamber, equipped with a clasp, of the carriage;

the body of the syringe is held by a cradle;

the central chamber and the cradle are aligned and disposed so that an axis Yc of the syringe is co-linear with the axis Y.

7. The device according to claim 5, wherein the cartridge is a cylindrical body, and wherein:

the rod is centrally fixed to the piston and is held by a clasp in a central chamber of the carriage;

two legs are fixed facing each other on the fixed table, one leg comprises a bore with a counter bore and the other leg comprises a half-bore with a shoulder so as to house the two ends of the cartridge;

the legs and the central chamber are aligned and disposed in such a way that an axis Yc of the syringe is co-linear with the axis Y.

8. A method for depositing paste patterns on a surface of a channel of a tube by implementation of the device according to claim 1.

* * * * *